(12) United States Patent
Malow

(10) Patent No.: US 6,223,875 B1
(45) Date of Patent: May 1, 2001

(54) CONVEYOR SECTION HAVING A STOP

(75) Inventor: Siegmar Malow, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 485 days.

(21) Appl. No.: 08/675,912

(22) Filed: Jul. 5, 1996

(30) Foreign Application Priority Data

Jul. 4, 1995 (DE) .............................................. 195 23 788

(51) Int. Cl.$^7$ .................................................. B65G 13/00
(52) U.S. Cl. .................................. 193/35 A; 193/35 SS; 193/35 B
(58) Field of Search ..................................... 193/32, 35 A, 193/35 B, 35 SS, 40; 198/345.1, 345.3; 414/276

(56) References Cited

U.S. PATENT DOCUMENTS

| | | | |
|---|---|---|---|
| 1,632,203 | * 6/1927 | Threefoot et al. .................. | 193/35 A |
| 2,306,101 | 12/1942 | Van Zandt . | |
| 3,990,557 | 11/1976 | Carder . | |
| 5,103,959 | * 4/1992 | Carlson ............................. | 198/345.1 |

FOREIGN PATENT DOCUMENTS

| | | |
|---|---|---|
| 69 48 906 | 12/1969 | (DE) . |
| 39 20 477 | 1/1991 | (DE) . |
| 55-98022 | 7/1980 | (JP) . |
| 4-223926 | 8/1992 | (JP) . |

* cited by examiner

Primary Examiner—Joseph E. Valenza
(74) Attorney, Agent, or Firm—Venable; Gabor J. Kelemen

(57) ABSTRACT

A conveyor section for transporting items in a conveying direction. The conveyor section defines a transport plane, and includes a stop roller having a rotational axis and an outer surface and being movable between an upper position in which the stop roller rises at least partially above the transport plane for stopping the items, and a lower position in which the transport plane is tangential to the outer surface of the stop roller. In its lower position, the stop roller functions as a conveyor roller for the items. The conveyor section further includes a guide for guiding a movement of the stop roller between its upper position and its lower position, and a pretensioned spring operatively connected to the stop roller for applying an upward force to the stop roller thus urging the stop roller in an upward direction. The application of at least a minimum predetermined downward force to the stop roller overcomes the upward force of the spring for moving the stop roller to its lower position.

5 Claims, 1 Drawing Sheet

CONVEYOR SECTION HAVING A STOP

CROSS REFERENCE TO RELATED APPLICATION

This application claims the priority of German application Serial No. 195 23 788.9 filed on Jul. 4, 1995, the subject matter of which is incorporated herein by reference.

FIELD OF THE INVENTION

The present invention relates to a conveyor section having a stop and being adapted to convey items, particularly open-top containers for carrying mail items in sorting machines.

BACKGROUND OF THE INVENTION

Known sorting machine conveyor sections may be configured as chute or roller conveyors which include conveying rollers arranged in series. Known stops for the roller conveyors may be operated electromagnetically or pneumatically. Disadvantages of the above conveyor sections include high production expenditures as well as a high energy requirement and actuation costs.

SUMMARY OF THE INVENTION

It is therefore an object of the present invention to provide a stop for a conveyor section which is simple in its design and in which a costly energy supply and actuation by means of electromagnetic and/or pneumatic lines can be dispensed with.

The above and other objects to become apparent as the description progresses are accomplished according to the invention by the provision of a conveyor section for transporting items in a conveying direction which defines a transport plane and comprises a stop roller having a rotational axis and an outer surface and being movable between an upper position in which the stop roller rises at least partially above the transport plane for stopping the items, and a lower position in which the transport plane is tangential to the outer surface of the stop roller. In its lower position, the stop roller functions as a conveyor roller for the items. The conveyor section further includes a guide for guiding a movement of the stop roller between its upper position and its lower position, and a pretensioned spring operatively connected to the stop roller for applying an upward force to the stop roller thus urging the stop roller in an upward direction. The application of at least a minimum predetermined downward force to the stop roller overcomes the upward force of the spring for moving the stop roller to its lower position.

According to one aspect of the invention, a conveyor system is provided which includes a conveyor section substantially as described above, together with an item to be transported by the conveyor section and disposed thereon. The item is configured for applying at least a minimum predetermined downward force to the stop roller when the stop roller is in its upper position for overcoming the upward force of the spring for moving the stop roller to its lower position. In the above case, the stop roller, the spring and the item are configured such that, in the upper position of the stop roller, contact points between the item and the stop roller are disposed above the rotational axis of the stop roller.

According to one aspect of the invention, the item may be configured for applying a force to the stop roller in the conveying direction at the contact points between the item and the stop roller for moving the stop roller to its lower position. The item may include a perpendicular front face, or a slanted portion on its front face. The slanted portion may be configured such that an angle between the slanted portion and the transport plane is adjustable.

According to the invention, the stop is configured as a stop roller which is urged in an upward direction by means of a pretensioned spring and is movable in a guide for moving the stop roller between an upper and a lower position. In the absence of external forces acting on the stop roller, the stop roller occupies its upper position as a result of the force applied thereto by the pretensioned spring. In its upper position, the stop roller rises above the transport plane and acts as a stop for an item to be transported. If an item to be transported pushes against the stop roller, the stop roller at first stays in its upper position.

Moreover, according to the invention, the force acting on the stop roller may be applied thereto by the item to be transported on the conveyor section. The above force, which is a shearing force, may be applied manually in the form of a short duration force impulse in the direction of conveyance. If the conveyor section is in an inclined position, the force action may be a result of the gravitational force of the item to be transported, which, for transport containers, corresponds to a defined filling level thereof. As soon as the force required for the compression of the spring is reached or exceeded, the stop roller is pushed downward to its lower position at the adjoining level of conveyance, that is, at the level of the transport plane, such that the transport plane is tangential to the outer surface of the stop roller, the stop roller thereby being effective for conveying the item to be transported. Accordingly, in its lower position, the stop roller does not apply any braking forces on the item to be transported.

In its upper position, the stop roller may project above the transport plane only to such an extent that the points where the items to be transported contact the stop roller (that is, the contact points) are disposed above the rotational axis of the stop roller. The above ensures that the items to be transported are capable of pushing the stop roller in a downward direction either by means of a force impulse exerted on the items to be transported or, in the case of conveyor sections with a gradient, by means of the gravitational force of the items. In conveyor systems using transport containers, the forces in the direction of conveyance required for pushing a stop roller in a downward direction can be varied by configuring the front faces of the transport containers such that the faces include slanted portions oriented at different angles with respect to the transport plane.

Furthermore, individual containers which are not intended to transmit a force to the stop roller to push the stop roller in a downward direction may be configured such that the points where they contact the stop roller are disposed below the rotational axis of the stop roller and, in such a case, the stop roller may be operated manually via a lever.

DETAILED DESCRIPTION OF THE PREFERRED EMBODIMENT

Figure 1:
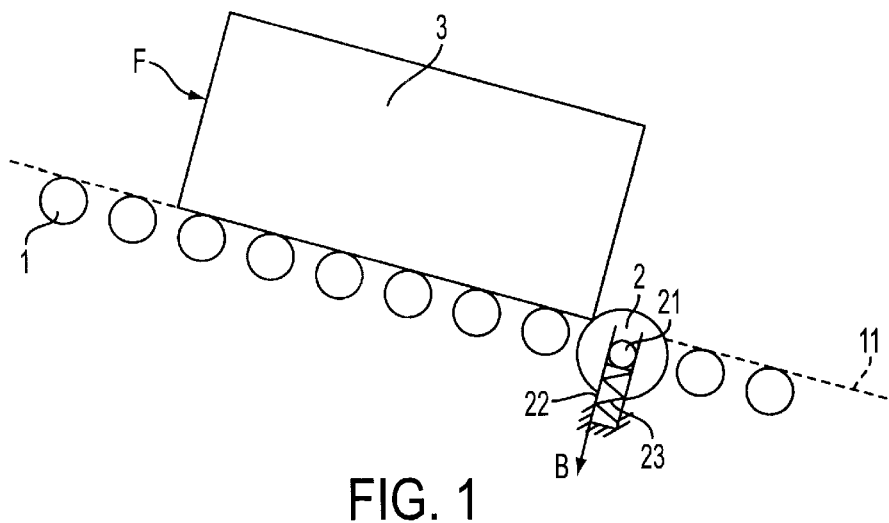
FIG. 1 is a schematic side elevational view of a conveyor section according to the invention showing the stop roller in its upper position and an item to be transported disposed on the conveyor section container supported on the conveyor section.

Turning to FIG. 1, the conveyor section is configured as a roller conveyor and includes rollers 1, which define a transport plane 11 for the items to be transported, such as transport containers 3. Axle 21 of stop roller 2 is movably disposed in a guide 22 and is urged upward within the guide by spring 23. Spring 23 thereby serves to move stop roller 2 into an upper position in which the stop roller rises above the transport plane 11 in the absence of other external forces. The position of the stop roller is selected such that the point where the transport container 3 contacts the stop roller 2 is disposed above the rotational axis of the stop roller.

Figure 2:
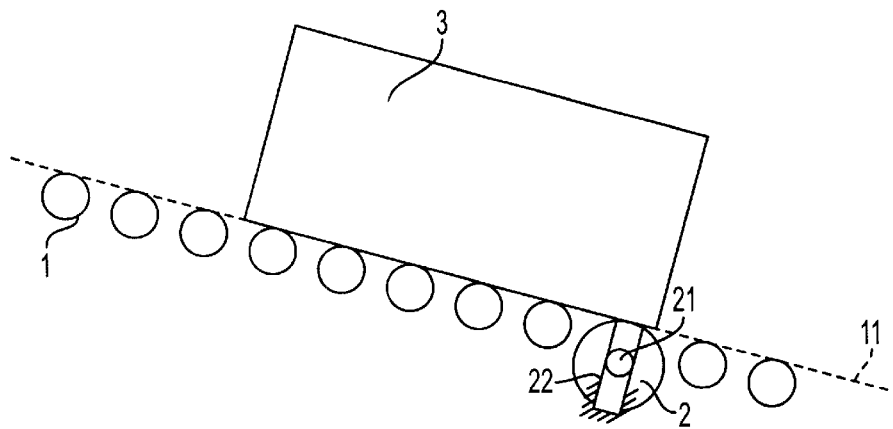
FIG. 2 is a view similar to FIG. 1 showing the stop roller in its lower position.

Referring to FIG. 2, stop roller 2 acts as a stop for container 3, and may be pushed downward by a shearing force transmitted thereto for a short time through container 3 when the container is itself subjected to a force in the direction of conveyance F. The minimum magnitude of the shearing force is adjustable by a pretensioning of spring 23. Through the action of the shearing force, the stop roller is pushed into its lower position such that the transport plane 11 is tangential to the outer surface of the stop roller. In this lower position, the stop roller serves to convey container 3 and thus functions as a conveyor roller rather than applying a braking force thereto. The angle between the direction of conveyance F and the direction of movement B of stop roller 2 must be greater than zero and, advantageously, amounts to 90° because, in that case, the distance between stop roller 2 and rollers 1, which are adjacent thereto, can be kept small and the conveying properties can therefore remain unimpaired.

Figure 3:
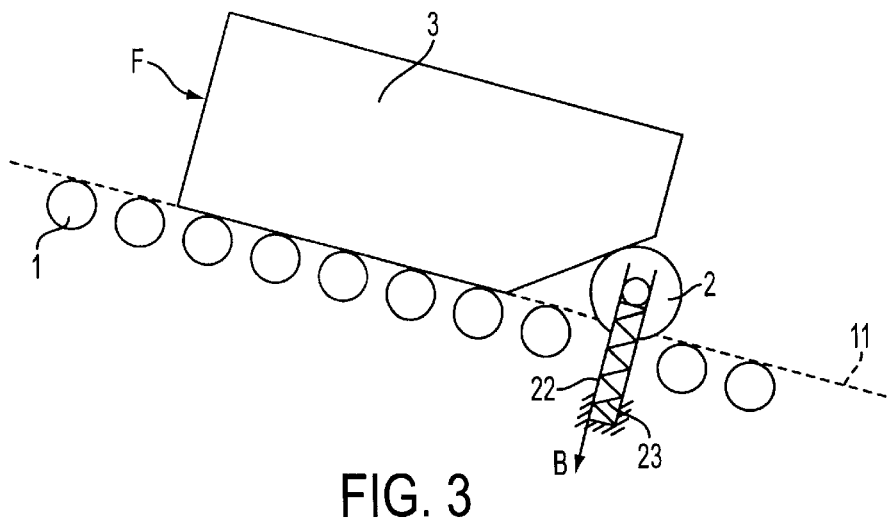
FIG. 3 is a view similar to FIG. 1 showing the stop roller in its upper position and an item supported on the conveyor section which has a slanted face.

The face of the transport containers 3 may be configured to include a slanted portion 3' inclined in the forward direction, as illustrated in FIG. 3. In that case, the stop roller 2 can be configured such that it can rise further above the transport plane 11 than in the case of transport containers having perpendicular faces. Furthermore, the transport containers may have faces provided with forward slanting portions which form different angles with respect to the transport plane. Thus, the force in the direction of conveyance F which is required for pushing stop roller 2 down into its lower position may have different values.

It is also possible to configure the face of the transport containers 3 such that the angle between the face and the transport plane 11 can be varied. The above can be accomplished, for example, by changeable sheet metal plates or ribs mounted on the face of the container.

The invention now being fully described, it will be apparent to one of ordinary skill in the art that any changes and modifications can be made thereto without departing from the spirit or scope of the invention as set forth herein.

What is claimed is:

1. A conveyor for advancing items in a conveying direction, in combination with force-exerting means for exerting an abutting force; said conveyor comprising (a) item-supporting means for defining a transport plane and for supporting the items thereon; and (b) an item-stopping device including (1) a stop roller disposed in a travel path of the items and forming an abutment to stop items in the advance thereof on said item-supporting means; said stop roller including an outer surface and a roller shaft having an axis constituting a rotational axis of said stop roller; said stop roller being shiftable into an upper end position and a lower end position; in said upper end position said outer surface of said stop roller being partially situated above said transport plane such that an item on said item-supporting means is adapted to abut said outer surface with said abutting force at a location above said rotational axis; in said lower end position said outer surface of said stop roller being situated below said transport plane and said transport plane being tangential to said outer surface;

(2) guide means for linearly guiding said roller shaft for a direction of motion having a principal component oriented perpendicularly to said transport plane; and (3) a spring urging said stop roller into said upper end position by a spring force; said spring force being opposed by a component force of said abutting force and being so dimensioned that said spring force is overcome by a predetermined magnitude of said component force for shifting said stop roller from said upper end position into said lower end position;

said force-exerting means comprising transport containers positioned on and advanced by said item-supporting means; said transport containers having a leading end wall for contacting said stop roller to exert said abutting force thereon.

2. The conveyor as defined in claim 1, wherein said transport containers have a leading end wall oriented perpendicularly to said transport plane and said conveying direction; said leading end wall being adapted to abut said stop roller at said location.

3. The conveyor as defined in claim 1, wherein said transport containers have a leading end wall having a wall portion oriented at an inclined angle to said transport plane; said wall portion being adapted to abut said stop roller at said location; said component force being a function of an inclination of said angle.

4. The conveyor as defined in claim 3, wherein said inclined angle is different for several of said containers, whereby said component force of said abutting force is different for said several containers.

5. The conveyor as defined in claim 1, wherein said item-supporting means comprises a roller track.

* * * * *